Figure 1:
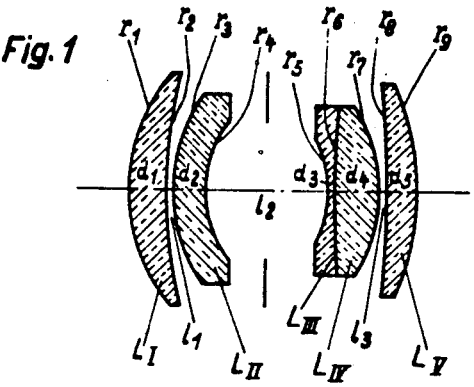

May 8, 1956   J. BERGER ET AL   2,744,447
PHOTOGRAPHIC OBJECTIVE COMPRISING FOUR AIR
SPACED MENISCUS SHAPED COMPONENTS
Filed June 14, 1952

United States Patent Office 2,744,447
Patented May 8, 1956

2,744,447

PHOTOGRAPHIC OBJECTIVE COMPRISING FOUR AIR SPACED MENISCUS SHAPED COMPONENTS

Johannes Berger, Heidenheim (Brenz), Wurttemberg, and Günther Lange, Konigsbronn, Wurttemberg, Germany, assignors to Carl Zeiss, Heidenheim (Brenz), Wurttemberg, Germany Application June 14, 1954, Serial No. 436,348

10 Claims. (Cl. 88—57)

The invention concerns photographic objectives, which consist of four meniscus-shaped elements, of which the two outer are collective and the two inner dispersive, whereby the latter enclose the diaphragm and turn their concave surfaces towards this.

The investigations lying at the basis of the invention have shown, that one can achieve a good compromise between the aberrations determinative for the image excellence, if one developes the dispersive element lying immediately in front of the diaphragm as an uncemented lens and constructs the dispersive element lying immediately behind the diaphragm of two lenses of opposite refractive power cemented together with one another, and if the following conditions are fulfilled:

$$d_{II} \leq 0.9 d_{III}$$
$$0.1 \cdot f \leq d_{II} + d_{III} \leq 0.3 \cdot f$$
$$0.03 \cdot f \leq d_{II} \leq 0.12 \cdot f$$
$$1.0 \cdot \bar{r}_s \leq D_s \leq 2.0 \cdot \bar{r}_s$$
$$0.2 \cdot f \leq \bar{r}_s \leq 0.4 \cdot f$$
$$0.3 \cdot f \leq D_i \leq 0.5 \cdot f$$
$$0.5 L \leq D_s \leq 0.9 \cdot L \text{ and}$$
$$0.5 D_s \leq D_i \leq 0.75 D_s$$

wherein $d_{II}$ is the axial thickness of the second element;
$d_{III}$ is the axial thickness of the third element;
$D_s$ is the vertex distance between the two convex outer surfaces turned away from the diaphragm of the two inner lying dispersive elements;
$\bar{r}_s$ is the arithmetic mean of the absolute amounts of the radii of these two surfaces;
$D_i$ is the vertex distance between the two concave outer surfaces adjacent the diaphragm of the two inner lying dispersive elements;
L is the overall length, i. e. the vertex distance between the first and the last surface of the objective;
f is the focal length of the objective.

In order to attain a good correction of objectives with relatively large apertures, e. g. with a view to coma it is advisable to select $$r_1 < |r_k|$$
$$0.5 \cdot f \leq r_1 + |r_k| \leq 1.0 \cdot f \text{ and}$$
$$1.5 \cdot D_s \leq r_1 + |r_k| \leq 2.5 \cdot D_s$$

wherein $r_1$ is the radius of the front surface and
$|r_k|$ is the absolute value of the radius of the last surface of the objective.

It furthermore is advantageous for the correction of coma and astigmatism of the oblique pencils, to select in its amount the radius of the concave surface of the front collective meniscus-shaped element bordering on air less than the radius of the concave surface of the rear collective meniscus-shaped element bordering on air.

Furthermore it is advisable for the correction of the oblique pencils, to so place the cemented surface in the dispersive element immediately following the diaphragm, that it turns its convex side towards the diaphragm.

In order to achieve a good flattening of the image field and at the same time reduce the spherical overcorrection of the oblique pencils, it is suitable in accordance with a further idea of the invention to make the vertex distance between the concave surfaces adjacent to the diaphragm greater than the arithmetic mean of the absolute amounts of the radii of these two surfaces, and further to select:

$$1.0 \cdot \bar{r}_i \leq D_i \leq 1.5 \cdot \bar{r}_i$$
$$0.2 \cdot f \leq D_i \leq 0.4 \cdot f$$
$$1.6 \cdot f \leq r_i \leq 0.32 \cdot f$$

wherein $\bar{r}_i$ is the arithmetic mean of the absolute amounts of the radii of the two concave outer surfaces adjacent the diaphragm of the two inner lying dispersive elements.

Besides it is of advantage for the correction of the coma of the oblique pencils for the objectives in accordance with the invention to construct the front element of two lenses with opposite refractive power cemented with one another. It is advisable in this case to impart a collective effect to the cemented surface of the front element and to so place this surface, that it turns the convex side towards the diaphragm.

Figure 2:
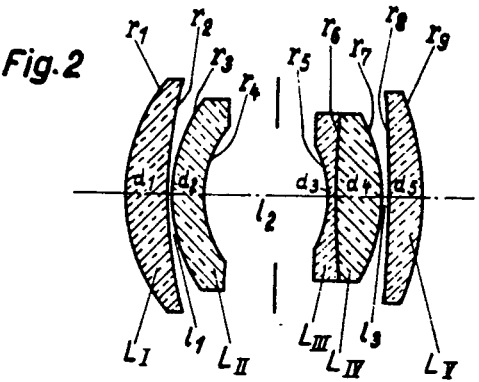
Figure 3:
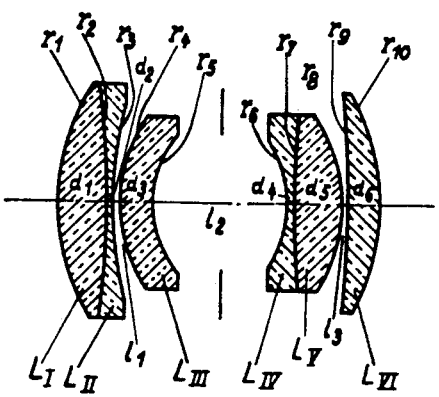

In the accompanying illustrations two constructions of objectives in accordance with the invention are represented, while in the following adduced tables numerical data are given for three examples of objectives which are constructed in accordance with the invention. Fig. 1 corresponds to Example I, Fig. 2 to Example II, and Fig. 3 to Example III, whereby Examples I and II are similar to one another in construction.

In the figures and in the examples are designated

With $r$ the radii,
With $d$ the thicknesses and
With $l$ the distances of the individual elements.

The values are referred to the focal length $f=1$. Example I has the relative aperture 1:3.5, the two other Examples II and III the relative aperture 1:2.8.

Example I

[Focal intercepts = 0.7317·l.]

| Lenses | Radii | Thicknesses and distances | $n_d$ | V |
|---|---|---|---|---|
| $L_I$ | $r_1 = +0.335054$ | $d_1 = 0.07336$ | 1.62041 | 60.3 |
|  | $r_2 = +0.891477$ | $l_1 = 0.00133$ |  |  |
| $L_{II}$ | $r_3 = +0.311791$ | $d_2 = 0.06176$ | 1.76182 | 26.5 |
|  | $r_4 = +0.216020$ | $l_2 = 0.23343$ |  |  |
| $L_{III}$ | $r_5 = -0.216020$ | $d_3 = 0.01334$ | 1.69895 | 30.1 |
|  | $r_6 = +2.175804$ | $d_4 = 0.08670$ | 1.65832 | 57.3 |
|  | $r_7 = -0.302948$ | $l_3 = 0.00133$ |  |  |
| $L_V$ | $r_8 = -2.239296$ | $d_5 = 0.06002$ | 1.75520 | 27.5 |
|  | $r_9 = -0.501321$ |  |  |  |

Example II

[Focal intercepts=0.73487·f.]

| Lenses | Radii | Thicknesses and distances | $n_d$ | V |
|---|---|---|---|---|
| $L_I$ | $r_1=+0.333306$ | $d_1=0.07434$ | 1.62041 | 60.3 |
| | $r_2=+0.837244$ | $l_1=0.00095$ | | |
| $L_{II}$ | $r_3=+0.305737$ | $d_2=0.06290$ | 1.76182 | 26.5 |
| | $r_4=+0.211827$ | $l_2=0.23825$ | | |
| $L_{III}$ | $r_5=-0.222767$ | $d_3=0.01334$ | 1.71736 | 29.5 |
| | $r_6=+1.769465$ | | | |
| $L_{IV}$ | | $d_4=0.09196$ | 1.69100 | 54.8 |
| | $r_7=-0.316935$ | $l_3=0.00095$ | | |
| | $r_8=-2.928237$ | | | |
| $L_V$ | | $d_5=0.06099$ | 1.75520 | 27.5 |
| | $r_9=-0.528256$ | | | |

Example III

[Focal intercepts=0.8200·f.]

| Lenses | Radii | Thicknesses and distances | $n_d$ | V |
|---|---|---|---|---|
| $L_I$ | $r_1=+0.409653$ | $d_1=0.09305$ | 1.66672 | 48.4 |
| | $r_2=-1.752482$ | | | |
| $L_{II}$ | $r_3=+0.749752$ | $d_2=0.01241$ | 1.60323 | 42.5 |
| | $r_4=+0.294218$ | $l_1=0.00596$ | | |
| $L_{III}$ | | $d_3=0.05335$ | 1.76182 | 26.5 |
| | $r_5=+0.211303$ | $l_2=0.25434$ | | |
| $L_{IV}$ | $r_6=-0.232022$ | $d_4=0.01241$ | 1.67270 | 32.2 |
| | $r_7=+2.062879$ | | | |
| $L_V$ | | $d_5=0.09553$ | 1.58875 | 51.1 |
| | $r_8=-0.311650$ | $l_3=0.00124$ | | |
| $L_{VI}$ | $r_9=-2.174814$ | $d_4=0.06203$ | 1.74400 | 44.7 |
| | $r_{10}=-0.433921$ | | | |

Example III is characterized by a relatively long focal intercept and therefore is particularly suitable for installation in mirror reflex cameras, in which place is to be provided for a folding mirror between objective and film. For this purpose for example the objective can be constructed with a focal length of f=80 mm. for an image size of 60 x 60 mm.

We claim:

1. Photographic objective, consisting of four meniscus-shaped elements, of which the two outer are collective and the two inner dispersive, whereby the latter surround the diaphragm and turn their concave surfaces towards this, the dispersive element lying immediately in front of the diaphragm being an uncemented lens and the element lying immediately behind the diaphragm consisting of two lenses of opposite refractive power cemented to one another, and the following conditions being fulfilled:

$$d_{II} \leq 0.9 d_{III}$$

$$0.1 \cdot f \leq d_{II} + d_{III} \leq 0.3 \cdot f$$

$$0.03 \cdot f \leq d_{II} \leq 0.12 \cdot f$$

$$1.0 \cdot \bar{r}_s \leq D_s \leq 2.0 \cdot \bar{r}_s$$

$$0.2 \cdot f \leq \bar{r}_s \leq 0.4 \cdot f$$

$$0.3 \cdot f \leq D_s \leq 0.5 \cdot f$$

$$0.5 L \leq D_s \leq 0.9 \cdot L \text{ and}$$

$$0.5 D_s \leq D_z \leq 0.75 D_s$$

$d_{II}$ being the axial thickness of the second element;
$d_{III}$ being the axial thickness of the third element;
$D_s$ being the vertex distance between the two convex outer surfaces turned away from the diaphragm of the two inner lying dispersive elements;
$\bar{r}_s$ being the arithmetic mean of the absolute amounts of the radii of these two surfaces;
$D_z$ being the vertex distance between the two concave outer surfaces adjacent the diaphragm of the two inner lying dispersive elements;
$L$ being the overall length, i. e. the vertex distance between the first and the last surface of the objective;
$f$ being the focal length of the objective.

2. Photographic objective according to claim 1, in which the following conditions are fulfilled additionally:

$$r_1 < |r_n|$$

$$0.5 \cdot f \leq r_1 + |r_n| \leq 1.0 \cdot f \text{ and}$$

$$1.5 \cdot D_s \leq r_1 + |r_n| \leq 2.5 \cdot D_s$$

$r_1$ being the radius of the front surface and
$|r_n|$ being the absolute value of the radius of the last surface of the objective.

3. Photographic objective according to claim 1, the radius of the concave surface bordering on air of the front collective meniscus-shaped element being less in amount than the radius of the concave, and the following conditions being fulfilled additionally:

$$1.0 \cdot \bar{r}_z \leq D_z \leq 1.5 \cdot \bar{r}_z$$

$$0.2 \cdot f \leq D_z \leq 0.4 \cdot f$$

$$1.6 \cdot f \leq \bar{r}_z \leq 0.32 \cdot f$$

$\bar{r}_z$ being the arithmetic means of the absolute amounts of the radii of the two concave outer surfaces adjacent the diaphragm of the two inner lying dispersive elements.

4. Photographic objective according to claim 1, the cemented surface in the dispersive element lying immediately behind the diaphragm being turned with its convex side towards the diaphragm, and the radius of the concave surface bordering on air of the front collective meniscus-shaped element being less in amount than the radius of the concave, and the following conditions being fulfilled additionally:

$$1.0 \cdot \bar{r}_z \leq D_z \leq 1.5 \cdot \bar{r}_z$$

$$0.2 \cdot f \leq D_z \leq 0.4 \cdot f$$

$$1.6 \cdot f \leq \bar{r}_z \leq 0.32 \cdot f$$

$\bar{r}_z$ being the arithmetic mean of the absolute amounts of the radii of the two concave outer surfaces adjacent the diaphragm of the two inner lying dispersive elements.

5. Photographic objective according to claim 1, the vertex distance between the two concave surfaces adjacent to the diaphragm being greater than the arithmetic mean of the absolute amounts of the radii of these two surfaces.

6. Photographic objective according to claim 1, the collective front element consisting of two cemented together lenses of opposite refractive power.

7. Photographic objective according to claim 1, the cemented surface in the collective front element having collective effect and turning the convex side towards the diaphragm.

8. Photographic objective according to the claim 1, the refractive power $(\Delta n/r)$ each deviating at most by $\pm 0.2/f$ and the lens thicknesses $(d)$ and air spaces $(l)$ each by at most ±0.05·f from the values to be taken from the following numerical example:

|  | Radii | Thicknesses and distances | $n_d$ | V |
|---|---|---|---|---|
| $L_I$ | $r_1=+0.335054·f$ | $d_1=0.07336·f$ | 1.62041 | 60.3 |
|  | $r_2=+0.891477·f$ | $l_1=0.00133·f$ |  |  |
| $L_{II}$ | $r_3=+0.311791·f$ | $d_2=0.06176·f$ | 1.76182 | 26.5 |
|  | $r_4=+0.216020·f$ | $l_2=0.23343·f$ |  |  |
| $L_{III}$ | $r_5=-0.216020·f$ | $d_3=0.01334·f$ | 1.69895 | 30.1 |
| $L_{IV}$ | $r_6=+2.175804·f$ | $d_4=0.06670·f$ | 1.65832 | 57.3 |
|  | $r_7=-0.302948·f$ | $l_3=0.00133·f$ |  |  |
| $L_V$ | $r_8=-2.239296·f$ | $d_5=0.06002·f$ | 1.75520 | 27.5 |
|  | $r_9=-0.501321·f$ |  |  |  |

$L_I$ to $L_V$ being the individual elements,
$r_1$ to $r_9$ being the radii and
$d_1$ to $d_5$ being the thicknesses of the elements,
$l_1$ to $l_3$ being the air separations between the elements
$n_d$ being the refractive indices and
V being the Abbe numbers of the elements, and
f being the focal length of the objective.

9. Photographic objective according to claim 1 the refractive powers ($\Delta n/r$) each deviating at most by ±0.2/f and the lens thicknesses ($d$) and air spaces ($l$) each by at most ±0.05·f from the values to be taken from the following numerical example:

|  | Radii | Thicknesses and distances | $n_d$ | V |
|---|---|---|---|---|
| $L_I$ | $r_1=+0.333308·f$ | $d_1=0.07434·f$ | 1.62041 | 60.3 |
|  | $r_2=+0.837244·f$ | $l_1=0.00095·f$ |  |  |
| $L_{II}$ | $r_3=+0.305737·f$ | $d_2=0.06290·f$ | 1.76182 | 26.5 |
|  | $r_4=+0.211827·f$ | $l_2=0.23825·f$ |  |  |
| $L_{III}$ | $r_5=-0.222767·f$ | $d_3=0.01334·f$ | 1.71736 | 29.5 |
| $L_{IV}$ | $r_6=+1.769465·f$ | $d_4=0.09196·f$ | 1.69100 | 54.8 |
|  | $r_7=-0.316935·f$ | $l_3=0.00095·f$ |  |  |
| $L_V$ | $r_8=-2.928237·f$ | $d_5=0.06099·f$ | 1.75520 | 27.5 |
|  | $r_9=-0.528266·f$ |  |  |  |

$L_I$ to $L_V$ being the individual elements,
$r_1$ to $r_9$ being the radii and
$d_1$ to $d_5$ being the thicknesses of the elements,
$l_1$ to $l_3$ being the air separations between the elements,
$n_d$ being the refractive indices and
V being the Abbe numbers of the elements, and
f being the focal length of the objective.

10. Photographic objective according to claim 1, the refractive powers ($\Delta n/r$) each deviating at most by ±0.5/f and the lens thicknesses ($d$) and the air spaces ($l$) each by at most ±0.05·f from the values to be taken from the following numerical example:

|  | Radii | Thicknesses and distances | $n_d$ | V |
|---|---|---|---|---|
| $L_I$ | $r_1=+0.409653·f$ | $d_1=0.09305·f$ | 1.66672 | 48.4 |
|  | $r_2=-1.752482·f$ |  |  |  |
| $L_{II}$ | $r_3=+0.749752·f$ | $d_2=0.01241·f$ | 1.60323 | 42.5 |
|  | $r_4=+0.294218·f$ | $l_1=0.00596·f$ |  |  |
| $L_{III}$ | $r_5=+0.211303·f$ | $d_3=0.05335·f$ | 1.76182 | 26.5 |
|  | $r_6=-0.232022·f$ | $l_2=0.25434·f$ |  |  |
| $L_{IV}$ | $r_7=+2.082879·f$ | $d_4=0.01241·f$ | 1.67270 | 32.2 |
| $L_V$ | $r_8=-0.311650·f$ | $d_5=0.09553·f$ | 1.58875 | 51.1 |
|  | $r_9=-2.174814·f$ | $l_3=0.00124·f$ |  |  |
| $L_{VI}$ | $r_{10}=-0.433921·f$ | $d_6=0.06203·f$ | 1.74400 | 44.7 |

$L_I$ to $L_{VI}$ being the individual elements,
$r_1$ to $r_{10}$ being the radii and
$d_1$ to $d_6$ being the thicknesses of the elements,
$l_1$ to $l_3$ being the air separations between the elements,
$n_d$ being the refractive indices and
V being the Abbe numbers of the elements, and
f being the focal length of the objective.

References Cited in the file of this patent
UNITED STATES PATENTS

| 583,336 | Rudolph | May 25, 1897 |
| 2,171,640 | Berek | Sept. 5, 1939 |
| 2,343,627 | Aklin | Mar. 7, 1944 |
| 2,670,659 | Tronnier | Mar. 2, 1954 |
| 2,672,788 | Brendel | Mar. 23, 1954 |
| 2,683,398 | Klemt et al. | July 13, 1954 |